United States Patent [19]

Vaz et al.

[11] Patent Number: 4,845,329
[45] Date of Patent: Jul. 4, 1989

[54] MOISTURE REMOVAL FROM VISUAL GLASS SURFACES BY DIELECTRIC HEATING

[75] Inventors: Nuno A. Vaz, West Bloomfield; Thomas H. VanSteenkiste, Washington; George W. Smith, Birmingham, all of Mich.

[73] Assignee: General Motors Corporation, Detroit, Mich.

[21] Appl. No.: 274,152

[22] Filed: Nov. 21, 1988

[51] Int. Cl.$^4$ .............................................. H05B 6/54
[52] U.S. Cl. .............................. 219/10.81; 219/10.57; 219/10.491; 219/203
[58] Field of Search ............. 219/10.81, 10.57, 10.491, 219/203; 244/134 D

[56] References Cited

U.S. PATENT DOCUMENTS

| | | | |
|---|---|---|---|
| 2,212,522 | 8/1940 | Hart, Jr. et al. | 219/10.81 |
| 2,263,063 | 7/1966 | Marriott et al. | 219/10.57 X |
| 2,773,160 | 12/1956 | Campbell et al. | 219/10.81 |
| 2,773,162 | 12/1956 | Christensen | 219/10.81 |
| 3,409,759 | 11/1968 | Boicey et al. | 244/134 D |
| 3,475,588 | 10/1969 | McMaster | 219/203 |
| 4,728,547 | 3/1988 | Vaz et al. | 428/1 |

OTHER PUBLICATIONS

H. G. Craighead, Julian Cheng, and S. Hackwood, New Display Based on Electrically Induced Index Matching in an Inhomogeneous Medium, Appl. Phys. Lett. 40(1), p. 22, 1 Jan. 22, 1982.

James L. Fergason, Polymer Encapsulated Nematic Liquid Crystals for Display and Light Control Applications, SID Digest of Technical Papers 16, p. 68, 1985.

J. W. Doane, N. A. Vaz, B.-G. Wu, and S. Zumer, Field Controlled Light Scattering From Nematic Microdroplets, Appl. Phys. lett. 48(4), p. 269, Jan. 27, 1986.

Nuno A. Vaz, George W. Smith, and G. Paul Montgomery, Jr., A Light Control Film Composed of Liquid Crystal Droplets Dispersed in an Epoxy Matrix, Mol. Cryst. Liq. Cryst., vol. 146, p. 17, 1987.

T. W. Dakin, Insulating Materials, "American Electrician's Handbook", McGraw-Hill, New York, p. 4–124, 1981.

Nuno A. Vaz and G. Paul Montgomery, Jr., Refractive Indices of Polymer-Dispersed Liquid Crystal Film Materials: Epoxy Based Systems, J. Appl. Phys. 62(8), Oct. 15, 1987.

Lev Mikhaylovich Blinov, Electro-Optical and Magneto-Optical Properties of Liquid Crystals, John Wiley & Sons Limited, New York, Chapter 2, 1983.

A. R. Blythe, Electrical Properties of Polymers, Cambridge University Press, Cambridge, 1979.

M. Schadt, Dielectric Properties of Some Nematic Liquid Crystals with Strong Positive Dielectric Anisotropy, J. Chem. Phys. 56, p. 1494, Feb. 15, 1972.

M. Schadt, Low-Frequency Dielectric Relaxations in Nematics and Dual-Frequency Addressing of Field Effects, Mol. Cryst. Liq. Cryst., vol. 89, pp. 77, 1982.

M. Schadt, Effects of Dielectric Relaxations and Dual-Frequency Addressing on the Electro-Optics of Guest-Host Liquid Crystal Displays, Appl. Phys. Lett. 41(8), Oct. 15, 1982.

(List continued on next page.)

Primary Examiner—Philip H. Leung
Attorney, Agent, or Firm—Tim G. Jaeger

[57] ABSTRACT

In an automotive vehicle having a visual glass pane subject to collecting vision obscuring moisture in the form of ice, frost, mist, fog, etc., apparatus is provided for removing the collected moisture. Specifically, the apparatus comprises a transparent layer of dielectric material underlying the glass pane in heat conducting relationship thereto, and means for producing dielectric heating of the dielectric material to thereby heat the glass and remove the collected moisture. Preferably, the layer of dielectric material is a polymer film and the means for producing dielectric heating includes a pair of transparent electrodes extending over the layer of dielectric material. For ease of fabrication, the pair of electrodes may be interdigitated on the same side of the layer of dielectric material.

4 Claims, 1 Drawing Sheet

OTHER PUBLICATIONS

W. H. de Jeu and Th. W. Lathouwers, Mol. Cryst. Liq. Cryst., vol. 26, p. 225, 1982.

G. Baur, A. Stieb, and G. Meier, Controlled Decay of Electrically Induced Deformations in Nematic Liquid Crystals, Appl. Phys. 2, p. 349, 1973.

George W. Smith and Nuno A. Vaz, The Relationship Between Formation Kinetics and Microdroplet Size of Epoxy-Based Polymer-Dispersed Liquid Crystals, Liq. Cryst., vol. 3, No. 5, p. 543, 1988.

T. K. Bose, B. Campbell, S. Yagihara, and J. Thoen, Dielectric-Relaxation Study of Alkylcyanobiphenyl Liquid Crystals Using Time-Doman Spectroscopy, Phys. Rev. A, p. 5767, Dec. 15, 1987.

A. Buka and A. H. Price, Dielectric Relaxation and Order Parameters in the Nematic and Smectic Phases of 4-n-octyl-4'-cyanobiphenyl (8CB), Mol. Cryst. Liq. Cryst. 116, p. 187, 1985.

Frederick G. Yamagishi, Deborah S. Smythe, Leroy J. Miller, and J. David Margerum, Photochemical and Thermal Stability Studies on a Liquid Crystal Mixture of Cyanobiphenyls, Liquid Crystal and Ordered Fluids, vol. 3, p. 475, 1978.

Anna M. Lackner and J. David Margerum, Improved Materials for DC Dynamic Scattering at Elevated Temperatures, Mol. Cryst. Liq. Cryst., vol. 122, p. 111, 1985.

Anna M. Lackner, J. David Margerum, and Camille Van Ast, Near Ultraviolet Photostability of Liquid Crystal Mixtures, Mol. Cryst. Liq. Cryst., vol. 141, p. 289, 1986.

MOISTURE REMOVAL FROM VISUAL GLASS SURFACES BY DIELECTRIC HEATING

This invention relates to the removal of the moisture from the surface of a visual glass pane by dielectrically heating the glass.

In a number of applications, the surface of a visual glass pane can become contaminated with vision obscuring moisture. One example is the condensation of moisture on the surface of automotive vehicle glass panes including windshields, backlites, side windows, sunroofs and mirrors. In such case, the condensed moisture may take the form of ice, frost, mist, fog, etc.

According to one aspect of the invention, moisture is removed by evaporation and otherwise from the surface of a visual glass pane by dielectrically heating the glass.

In another aspect of the invention, the required heating of the glass is accomplished by underlaying the glass pane with a transparent layer of dielectric material which is in heat conducting relationship with the glass and which is subjected to dielectric heating. Preferably the dielectric material is a polymer film.

Pursuant to a further aspect of the invention, the dielectric heating is produced by a high frequency voltage source operating in conjunction with a pair of transparent electrodes. Preferably, the electrodes are interdigitated on the same side of the dielectric layer for ease of fabrication.

These and other aspects and advantages of the invention may be best understood by reference to the following detailed description when taken in conjunction with the accompanying drawing in which.

Figure 1:
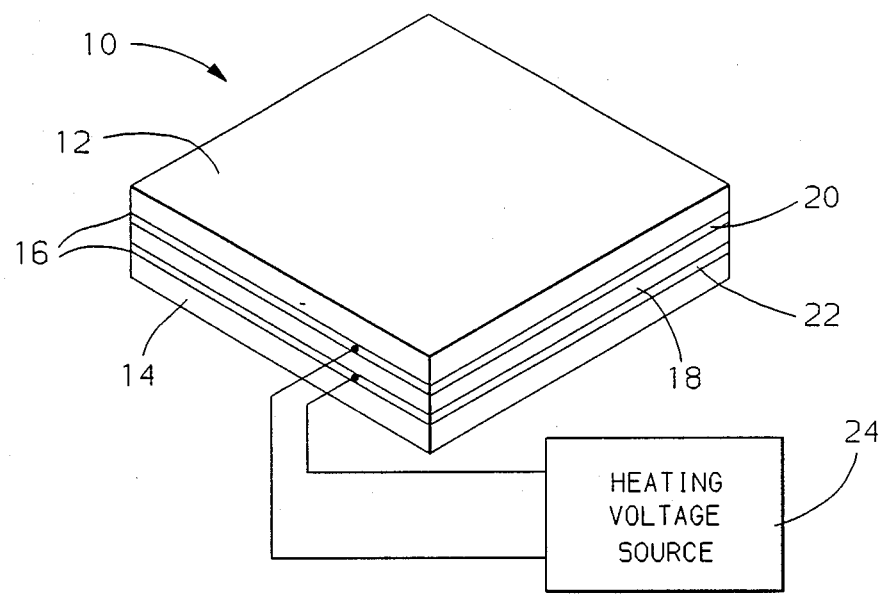
FIG. 1 shows one embodiment of the invention.

Referring to FIG. 1, a window structure 10 includes inner and outer transparent glass plates 12 and 14 separated by an intermediate space 16. As an example, the window 10 may represent a portion of the windshield of an automotive vehicle. In such case, moisture may collect by condensation or otherwise on the exposed surfaces of the glass plates 12 and 14. Depending upon ambient environmental conditions, this vision obscuring moisture contamination may take the form of ice, frost, mist, fog, etc. According to the invention, collected moisture is removed by evaporation and otherwise from the exposed surfaces of the glass plates 12 and 14 by dielectrically heating the window 10.

Specifically, a transparent layer 18 of dielectric material is provided within the intermediate space 16 in heat conducting relationship with the glass plates 12 and 14. Preferably, the dielectric material 18 is a polymer film. Further, transparent electrodes 20 and 22, which may be indium-tin-oxide coatings, cover the interior surfaces of the glass plates 12 and 14, respectively, on either side of the dielectric layer 18. A source 24 of heating voltage $V_h$ is connected across the electrodes 20 and 22 for selectively applying a relatively high frequency electric field to the dielectric layer 18. In response, the dielectric layer 18 becomes heated and this heat is transferred to the glass plates 12 and 14 which also become heated. As a result, moisture collected on the exposed surfaces of the glass plates 12 and 14 is removed by evaporation and otherwise.

The amount of heat generated within the window 10 is dependent upon the density of polarizable electric dipoles within the dielectric layer 18 and the frequency of the applied electric field. In general the higher the electric dipole density, the greater the amount of dielectric heating. For most dielectric materials, including the polymer film 18, maximum dielectric heating occurs at a frequency in the $MH_z$ range (which is somewhat inconveniently high). Fortunately, the electric dipole density of the polymer layer 18 is high enough that satisfactory dielectric heating can be achieved at electric field frequencies in the $KH_z$ range.

As an example, adequate heating results were obtained with a heating voltage $V_h$ of 50 volts RMS at frequencies ranging from 200 $KH_z$ to 800 $KH_z$. In this example, the dielectric layer 18 was a polymer material composed by volume as follows: 25 parts Photomer 6008 (Diamond Shamrock, Morristown, NJ), 25 parts Sartomer 210 (ARCO Chemical Co., West Chester, PA), 50 parts PETMP (Evans Chemetics, W. R. Grace & Co., Darrien, CT) and 10 parts Darocur 11730 (EM Industries, Hawthorne, NY). In addition, the polymer material was subjected to ultraviolet curing for 45 seconds at a curing temperature of 63° C. However, it should be understood that, insofar as known, the composition of the polymer material is not particularly important in achieving satisfactory heating results.

Figure 2:
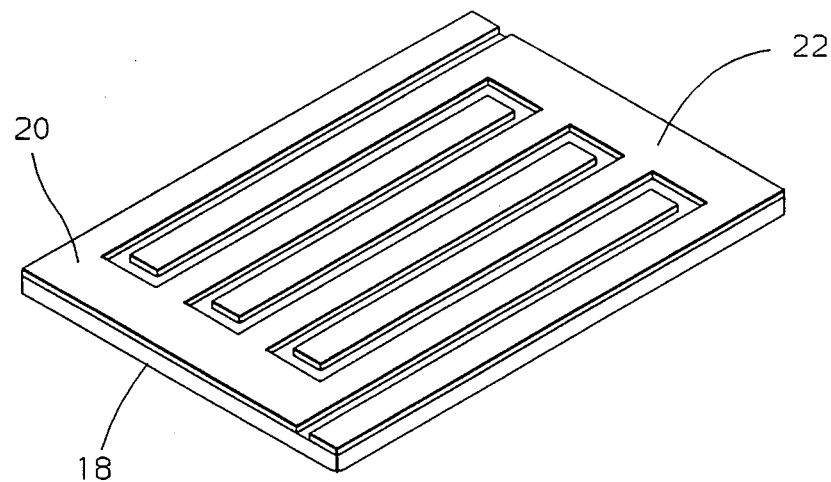
FIG. 2 shows an alternate embodiment of the invention.

In an alternate arrangement, as shown in FIG. 2, the transparent electrodes 20 and 22 may be provided in an interdigitated configuration on the same side of the dielectric layer 18 for ease of manufacture. In one possible method of fabrication, the interdigitated electrodes 20 and 22 may be formed via a deposition-masking-etching process administered on the inner surface of the glass plate 12.

It will be appreciated that the foregoing embodiments are intended to illustrate the invention without undue limitation, recognizing that various alterations and modifications may be made to these embodiments without departing from the spirit and scope of the invention.

The embodiments of the invention in which an exclusive property or privilege is claimed are defined as follows:

1. In an automotive vehicle having a visual glass pane subject to collecting vision obscuring moisture in the form of ice, frost, mist, fog, etc., apparatus for removing the collected moisture comprising:
   a transparent polymer film underlying the glass pane in heat conducting relationship thereto, and
   means for applying an electric field to the polymer film at a frequency high enough to produce dielectric heating of the polymer film sufficient to heat the glass and remove the collected moisture.

2. The apparatus of claim 1 wherein the frequency of the applied electric field is in the kilohertz range as opposed to the megahertz range.

3. The apparatus of claim 2 wherein the means for producing dielectric heating includes a pair of transparent electrodes extending over the polymer layer.

4. The apparatus of claim 3 wherein the pair of electrodes are interdigitated on the same side of the polymer layer for ease of fabrication.

* * * * *